Nov. 4, 1958 R. JANOWITZ 2,858,650
PAVEMENT CUTTER
Filed Nov. 28, 1955 3 Sheets-Sheet 2
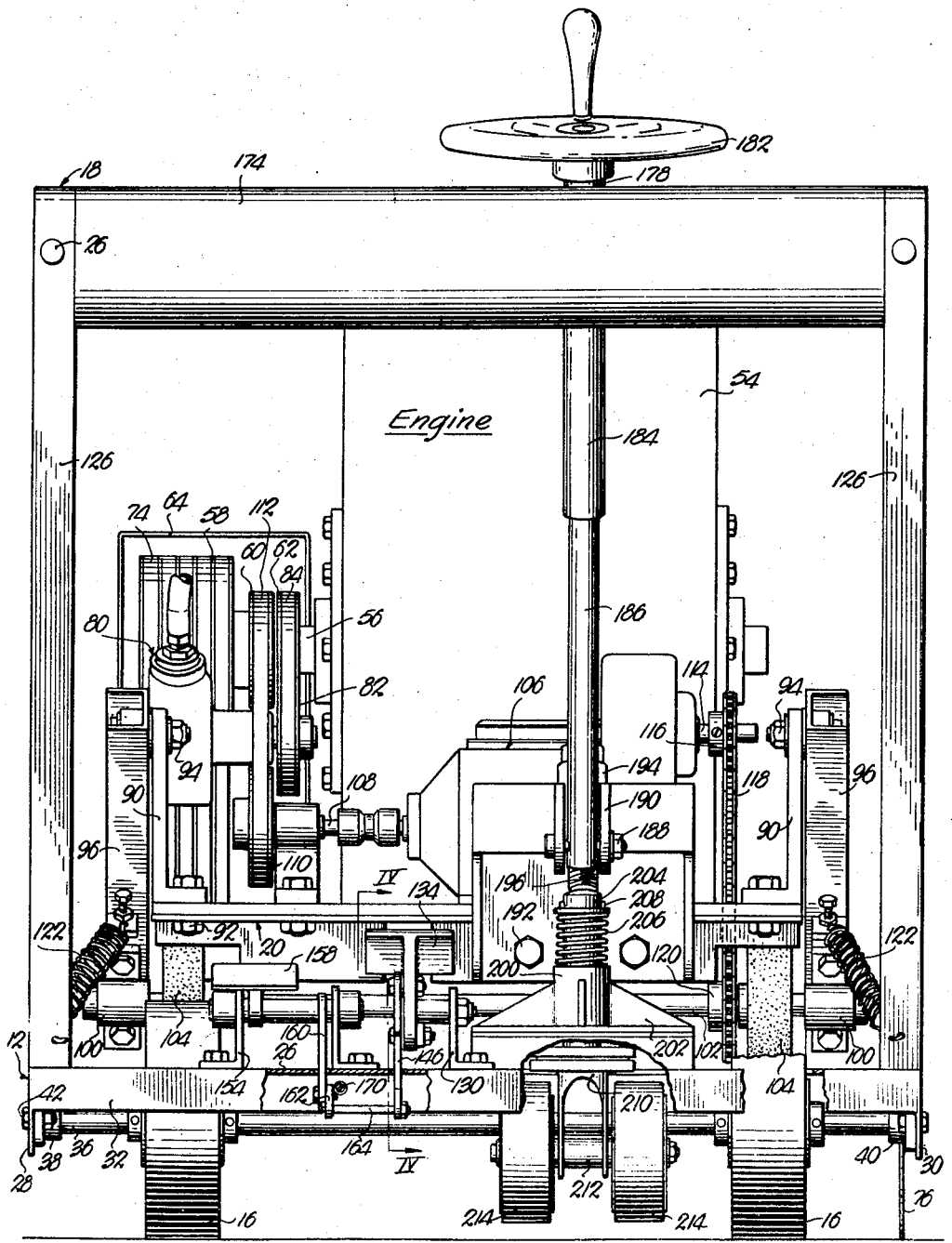
Fig. 2.
INVENTOR.
Robert Janowitz
BY 
ATTORNEY.

Nov. 4, 1958 — R. JANOWITZ — 2,858,650
PAVEMENT CUTTER
Filed Nov. 28, 1955 — 3 Sheets-Sheet 3

INVENTOR.
Robert Janowitz
BY
ATTORNEY.

United States Patent Office 2,858,650
Patented Nov. 4, 1958

2,858,650

PAVEMENT CUTTER

Robert Janowitz, Kansas City, Mo., assignor to Concrete Saw Company, Kansas City, Mo., a corporation of Missouri Application November 28, 1955, Serial No. 549,244

12 Claims. (Cl. 51—176)

This invention relates to a machine for cutting pavement or the like and, more particularly, to an improved, mobile concrete saw.

In mobile apparatus for cutting concrete or the like, it is necessary to provide relatively heavy carriage structure both for supporting the saw-driving prime mover and other structure associated therewith and for furnishing a sufficient weight to maintain the saw stably in operative position. Moreover, it is necessary that such carriage structure be of nature rendering the same adapted for advancement in a straight line, which latter result is normally accomplished by the provision of a number of ground-engaging wheels mounted on the carriage for rotation about fixed and carefully aligned axes. The structure conventionally provided for meeting such requirement, however, tends to render the apparatus difficult to maneuver during non-cutting movement of the apparatus, such as when it is being aligned with an intended line of cut or when it is being moved from one location to another.

Since the cutting blade must be shiftably mounted upon the carriage so that the same may be moved alternately into its lowered cutting position and a raised position wherein the blade clears the cut, difficulties have been encountered in effecting a suitable mechanical coupling between the cutter blade and its prime mover unless resort is had to unduly complex mechanisms. Further difficulty has been encountered in conventional pavement cutting apparatus in attempting to so mount the cutting blade upon the carriage that same can progressively lower itself into a cut as the latter is made with substantially uniform downward force being applied to the cutter blade regardless of the depth at which the cut is being made.

It is the primary object of this invention to provide a simple and reliable solution to the above-mentioned and other problems encountered in connection with conventional equipment.

It is another important object of the invention to provide carriage structure having a caster assembly controllably shiftable into a ground-engaging position lifting one pair of the regular carriage wheels out of engagement with the underlying pavement, whereby the entire apparatus may be rendered conveniently maneuverable for positioning thereof between cutting operations without the necessity of tilting or lifting of the heavy machine by an operator.

It is another important object of the invention to provide mechanism associated with the means for shifting said caster assembly which will automatically move the cutter blade out of engagement with the pavement, whenever the caster assembly is lowered into its ground-engaging position, thereby insuring complete removal of the cutter blade from a cut before the machine can be shifted from its alignment with the latter.

It is another important object of the invention to provide such mechanism which is of nature permitting the cutter blade to be shifted downwardly in selectively different amounts for making cuts of various, corresponding depths.

It is another important object of the invention to mount the prime mover for the cutter blade on a shiftable platform adapted for also carrying the blade itself and to provide means by which such prime mover may be alternately coupled with ground-engaging wheels on the main carriage for rendering the apparatus self-propelled during cutting and uncoupled therefrom during maneuvering of the machine into cutting position.

It is another important object of the invention to provide such apparatus having a mobile carriage provided with front and rear pairs of wheels normally in engagement with the ground, a vertically reciprocable caster wheel assembly adapted for movement between an upper position clearing the ground and a lower position engaging the ground and raising the rear portion of the carriage to a position where said rear carriage wheels are clear of the ground, a platform pivotally mounted on the carriage and carrying a prime mover, a cutter blade, a water pump, a transmission unit and a shiftably mounted drive wheel, means on the carriage for shifting the drive wheel into and out of engagement with one of the carriage wheels, and means on the carriage coupled with both the caster wheel assembly and the platform for simultaneously moving the assembly from its said lower ground-engaging position and the platform from a position where said blade clears the ground to respective positions where the assembly clears the ground and the blade engages the ground in cutting relationship, and vice versa.

Still other important objects of the invention will be made clear or become apparent as the following specification progresses.

In the accompanying drawings:

Fig. 2 is a rear elevational view of the apparatus, with parts broken away for clarity of illustration;

Figure 1:
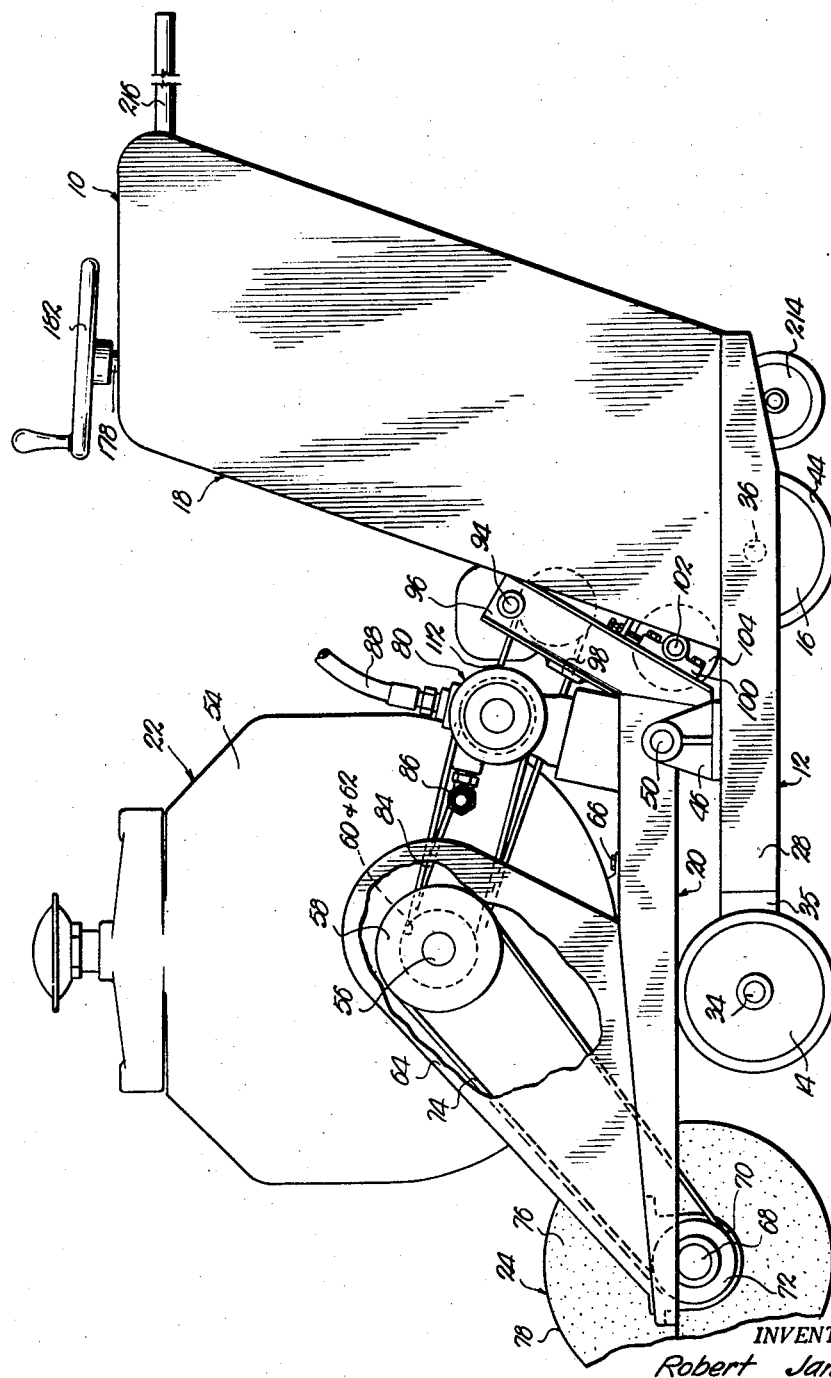
Fig. 1 is a fragmentary side elevational view of the apparatus, with parts broken away for clarity of illustration.

Referring now to the accompanying drawings, the improved pavement cutter apparatus of the invention is generally designated by the numeral 10. Apparatus 10 includes a main carriage 12 supported upon a pair of front ground-engaging wheels 14 and, normally, a pair of rear wheels 16. Carriage 12 also includes an upwardly extending, rear frame or super-structure generally designated 18. Pivotally mounted on the carriage 12 forwardly of frame 18 is a platform generally designated 20 which carries a prime mover generally designated 22 for propelling the entire apparatus 10 and driving a circular saw blade, generally designated 24 which is rotatably mounted on the platform 20 adjacent its forwardmost extremity.

Carriage 12 includes a top wall 26, a pair of side walls 28 and 30 depending from top wall 26 and a rear wall 32 also depending from top wall 26. The front wheels 14 are freely rotatable upon a horizontal cross shaft 34 extending and mounted upon a pair of laterally spaced forwardly extending elements 35 forming a part of carriage 12. The rear wheels 16 are rigidly mounted upon a horizontal cross shaft 35 rotatably journalled in bearings 38 and 40 secured to side walls 28 and 30 respectively by any suitable means such as bolts 42. Each of wheels 14 and 16, and particularly the latter, are preferably provided with an outer tire portion 44 of rubber or other frictional material.

Mounted upon the top wall 26 intermediate shafts 34 and 36 are a pair of laterally spaced upstanding brackets 46 and 48 which rotatably receive a horizontal pivot shaft 50, the brackets 46 and 48 being provided with suitable bearing means for so mounting the pivot shaft 50. The platform 20 is in turn pivotally mounted upon shaft 50 by bracket means 52 including shaft encircling means 53.

The prime mover 22 may comprise, for instance a gasoline engine 54 having a power shaft 56 provided with a number of pulleys 58, 60 and 62 thereon, same being normally covered by a protective shield 64 mounted on platform 20. The engine 54 may be mounted on the top of platform 20 in any suitable fashion as by bolts 66.

Adjacent the forwardmost extremity of platform 20 a saw-carrying shaft 68 is rotatably mounted in laterally spaced bearing means 70 and provided with a pulley 72 thereon. Power pulley 58 on shaft 56 is coupled with the pulley 72 by belt means 74 within shield 64. The saw blade 24 may be of any conventional type and comprises a circular disc 76 having an abrasive cutting edge 78, disc 76 being rigidly secured to shaft 68 outwardly of the platform 20 at the normally righthand side of the apparatus 10.

A suitable water pump generally designated 80 may also be mounted upon the platform 20 and provided with a pulley 82 coupled with the power pulley 62 by belt means 84. Pump 80 will conventionally include conduit means 86 for directing water to the zone of contact between blade 24 and the underlying pavement being cut, the pump inlet conduit being indicated at 88.

Rearwardly of the engine 54 and pump 60 are a pair of laterally spaced upstanding brackets 90 upon the top of platform 20, brackets 90 being secured to platform 20 by bolts or the like 92. Pivotally attached to each bracket 90 adjacent its uppermost end by any suitable pivotal fastening means 94 is an elongated element 96. Elements 96 are rigidly interconnected by a laterally extending cross bar 98. Adjacent the lowermost extremity of each element 96 is a bearing 100. Bearings 100 rotatably mount a drive shaft 102 extending therebetween. Rigidly mounted on drive shaft 102 are a pair of friction drive wheels 104 which are laterally spaced to align with the rear carriage wheel 16.

A transmission or gear box device generally designated 106 is mounted upon the platform 20 and provided with an input shaft 108 carrying a pulley 110 coupled with the power shaft 56 by belt means 112. Transmission device 106 also has an output shaft 114 provided with a sprocket 116 coupled by a chain 118 with a sprocket 120 rigidly mounted upon drive shaft 102. It will be noted that the output shaft 114 of transmission device 106 is in alignment with the axis of means 94 upon which upon which elements 96 are pivoted so that the shaft 102 is swingable upon elements 96 about the axis of shaft 114. The position to which elements 96 and shaft 102 are swung, therefore, has no effect upon the operation of the coupling chain 118.

A pair of elongated coil springs 122 are provided and each has one end thereof connected with a bracket 124 on a corresponding element 96 and the opposite end thereof connected to an upstanding side panel member 126 forming a part of frame 18 mounted upon carriage 12. Springs 122 thus yieldably bias the lowermost ends of elements 96 and the shaft 102 rearwardly toward a position bringing the drive wheels 104, which are preferably provided with an outer frictional surface 128, into engagement with the outer frictional portions 44 of wheel 16. It will, therefore, be clear that the drive wheels 104 are adapted to impart rotation to wheels 16 for propelling the apparatus 10 when the wheels 104 are biased against the wheels 16 by the springs 122 and the shaft 102 is driven by the engine 54 through the transmission device 106 and the associated couplings.

Since the springs 122 will normally bias the wheels 104 into driving engagement with wheels 16, it is necessary to provide means for shifting the wheels 104 out of engagement with wheels 16. For this purpose, an upstanding bracket 130 is mounted upon the top wall 26 of carriage 12 adjacent the rear of the latter and has pivoted thereto by fastening means 132 a combination crank and foot pedal 134. Pivotally connected to crank pedal 134 by fastening means 136 is an elongated adjustably extensible rod 138 having its opposite end pivotally connected as at 140 with a link 142 in turn pivotally connected by fastening means 144 with one of the elements 96. As will be particularly clear in Figs. 3 and 4, as crank pedal 134 is swung downwardly by the force of an operator's foot, the rod 138 and link 142 will function to swing elements 96 forwardly, thereby moving drive wheels 104 out of contacting engagement with the wheels 16.

In order that the wheels 104 may be releasably maintained out of contact with wheels 44 once the crank pedal 134 has been operated, an elongated latching member 146 is pivoted at its uppermost end by fastening means 148 to the crank pedal 134 and provided with a notch 150 adapted to engage the underside of an aligned notch 152 provided in rear wall 32 of carriage 12. The manner in which the latching member 146 is swung rearwardly to bring notch 150 into engagement with notch 152 will be hereinafter made clear.

Figures 3, 4:
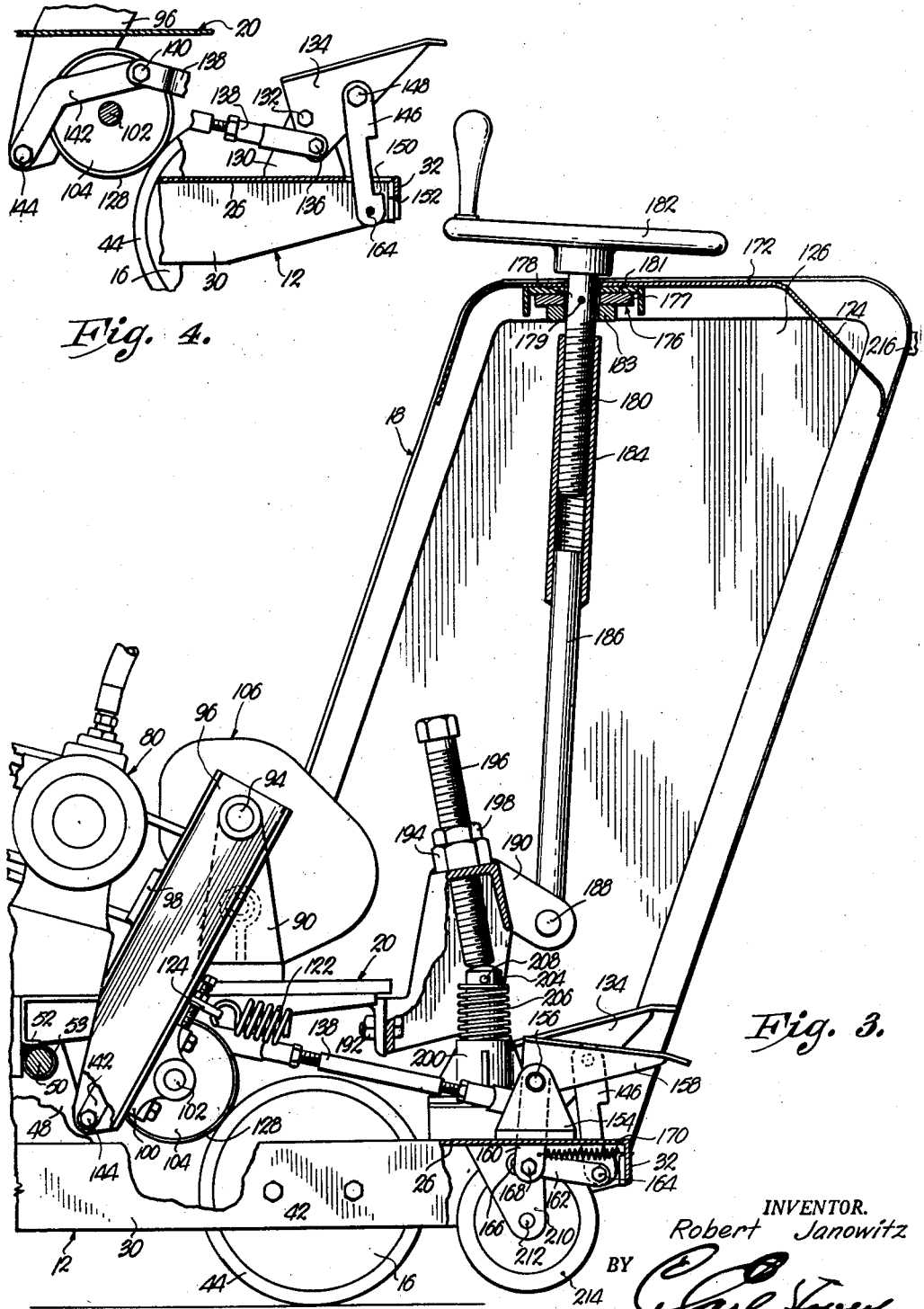
Fig. 3 is an enlarged, fragmentary elevational view of the rear portion of the carriage, with parts broken away and shown in section for clarity of illustration.
Fig. 4 is an enlarged, fragmentary, cross sectional view taken on irregular line IV—IV of Fig. 1.

Referring now particularly to Fig. 3, a second upstanding bracket 154 is provided upon the top wall 26 of carriage 12 and has pivotally mounted thereon by fastening means 156 a second crank pedal 158. Crank pedal 158, whose function is for releasing the latch member 146 when the latter is latched within notch 152 includes a depending arm 160. A link 162 is pivotally connected adjacent one extremity thereof with the latch member 146 by fastening means 164 and is provided adjacent the other extremity thereof with an elongated groove 166 receiving a pivotal fastening element 168 by which a lost motion connection with arm 160 is effected. A spring 170 extends between and is oppositely attached to arm 160 and rear wall 32 of carriage 12.

It will be clear that spring 170 normally yieldably draws arm 160 toward rear wall 32 of carriage 12, thereby moving link 162 to swing the latch member 146 rearwardly in a direction for latching engagement between notches 150 and 152. When the latching crank pedal 134 is stepped upon by an operator, the latching member 146 will travel downwardly until notches 150 and 152 are interengaged. Such interengagement will then hold the pedal 134 down, and thereby hold drive wheels 104 out of driving engagement with wheels 16, until the operator steps upon the release pedal 158 to swing arm 160 forwardly and draw the latching member 146 out of engagement with the notch 152. Thereupon, the heavy springs 122 will swing elements 96 in a direction moving wheels 104 into engagement with wheels 16 and restoring the latching pedal 134 to its normal, raised position.

The upper frame 18 includes, besides the side panels 126, a top plate 172 having a sloping rearward portion 174 on which various controls and the like (not shown) may be mounted. Secured to the underside of top panel 172 are bearing means 176 in which are rotatably mounted a substantially vertical shaft 178 having the lowermost portion thereof below panel 172 threaded as at 180. It will be understood that bearing means 176 conventionally include parts for preventing reciprocable movement of the shaft 178 relative to the bearing means 176 and frame 18, although permitting a limited degree of swinging movement of the shaft 178 relative to the bearing 176. In the bearing shown for illustration there is provided an annular keeper washer 177 attached to shaft 178 by a pin 179, washer 177 being between upper and lower retaining portions 181 and 184 of the bearing 176, such washer 177 and bearing portions 181 and 183 each being provided with openings for clearing the shaft 178 which are of somewhat larger dimension than the diameter of the latter.

A manually operable adjustable wheel or crank 182 is secured on the shaft 178 above panel 172. An elongated internally threaded sleeve 184 is received upon the threaded portion 180 of shaft 178 for reciprocation relative thereto when the shaft 178 is rotated. Sleeve 184 is in turn attached to one end of an elongated, rod-like element 186 whose lowermost end is pivotally interconnected by fastening means 188 with a bracket assembly 190 secured to the rear extremity of platform 20 by bolts or the like 192. Bracket assembly 190 also adjustably carries an internally threaded portion 194 thereof and an elongated bolt 196 which extends through the assembly 190 and may be secured in any position of reciprocation relative thereto by a lock nut 198.

As will be most clear from Figs. 2 and 3, the carriage 12 is provided adjacent its rearmost extremity with an upright, tubular sleeve 200 secured to the top wall 26 of carriage 12 by bracket means 202. Slidably received within sleeve 200 for vertical reciprocation relative thereto, as well as for free rotation about the axis of sleeve 200, is an elongated cylindrical shaft 204 extending both above and below the sleeve 200. A coil spring 206 abuts oppositely against the top of sleeve 200 and a pin 208 extending laterally from shaft 204 adjacent its uppermost extremity. On the lowermost extremity of the shaft 208, below the top wall 26 of carriage 12 is mounted a dolly 210 which carries a shaft 212 upon which a pair of caster wheels 214 are rotatably mounted. The lowermost end of bolt 196 is engageable with the uppermost end of shaft 204 so that, as shaft 178 is rotated to reciprocate sleeve 184 downwardly, bracket 190 will be swung downwardly about the axis of shaft 50 upon which platform 20 is pivoted and bolt 196 will be moved into engagement with shaft 204 to reciprocate the latter downwardly against the yieldable action of spring 206 until the caster wheels 214 are in engagement with the underlying pavement. Further turning of shaft 178 to move sleeve 184 downwardly will raise the wheels 16 of carriage 12 off of the underlying pavement, so that the entire apparatus 10 will then be freely maneuverable upon the wheels 14 and upon the caster wheels 214. A pair of handles 216 are provided at the rear of frame 18 for use by an operator in guiding the apparatus 10 during maneuvering of same into cutting position.

It may be noted that alignment guides for aligning the blade 24 with a proposed line of cut will be conventionally provided, although same are not specifically shown in the drawings. It is also pointed out that other conventional parts of the apparatus 10, such for instance as the ignition and operating controls for engine 54, have been omitted from the drawings for the sake of simplicity, since those skilled in the art will readily appreciate that such conventional structures are to be provided. Finally, in this regard, it should be observed that certain minor structural details of the machine or apparatus 10, such as the various individual members used to present the frames of carriage 12, platform 20 and super-structure 18 are not identified in minute detail and that certain other conventional elements, such as brackets, fastening means and the like, are not specifically numbered and described, since they are clearly shown in the drawings, are conventional in character, and form no material part of the invention herein disclosed.

In operating the machine or apparatus 10 it will be understood that, the first step would normally be to operate crank pedal 134 to move drive wheels 104 out of engagement with the rear carrigae wheels 16. The crank or handle 182 will then be operated to rotate threaded shaft 178 for moving sleeve 184 and 186 downwardly until the caster wheels 214 are in engagement with the underlying pavement, the rear carriage wheels 16 lifted clear of the pavement and the pavement cutting tool 24 likewise lifted clear of the pavement, if the machine 10 is not already in such condition. The engine 54 may then be started. The operator then by grasping handles 216 manually moves and guides the machine 10 to a position aligned with the cut intended to be made. Thereupon, by manipulation of crank 182 to raise sleeve 184 and element 186, the caster wheels 214 are lifted relative to the carriage 12 until the rear carriage wheels 16 are engaged with the underlying pavement and supporting the weight of the rear portion of the apparatus 10. Upon continued manipulation of the crank 182 in the same direction, platform 20 will continue to swing about the pivotal axis provided by shaft 50 until the blade 24 is lowered into engagement with the underlying pavement and has been permitted to cut downwardly therein to the depth desired for the cut. Whereupon, the operator may step upon crank pedal 158 to release the latching member 146 from notch 152 of rear wall 32, thereby permitting the heavy springs 122 to draw drive wheels 104 into operative engagement with the rear carriage wheels 16. Power from engine 54 transmitted through the gear reduction unit 106 to drive wheels 104 will then be applied to the rear carriage wheels 16 to advance the machine 10 in self-propelled fashion and in a linear path aligned with the intended line of cut. As soon as the end of the desired cut has been reached, the operator may step upon crank pedal 134 to move and lock drive wheels 104 out of engagement with the rear carriage wheels 16. By manipulation of the crank 182 to move sleeve 184 and element 186 downwardly the blade 24 may be withdrawn from the cut by virtue of the resulting swinging of platform 20 upon carriage 12 and the caster shaft 204 then reciprocated downwardly to move caster wheels 214 into engagement with the pavement and lift carriage wheel 216 out of engagement therewith, so that the machine 10 may be maneuvered into position for making the necessary desired cut.

It may be readily appreciated by those skilled in the art that many minor modifications and changes could be made from the precise structure described for purposes of illustration without departing from the true spirit or intention of the invention. Accordingly, it is to be understood that the invention shall be deemed limited only by the scope of the appended claims.

Having thus described the invention, what is claimed as new and desired to be secured by Letters Patent is:

1. In a machine for cutting concrete pavement or the like; a carriage having front and rear ends; pavement cutting mechanism, including a pavement-engaging tool and a prime mover for operating the latter; structure mounting said mechanism on the carriage, the tool being shiftable relative to the carriage for movement into and out of engagement with the underlying pavement to be cut; a pair of laterally spaced, pavement-engaging wheels mounted on the carriage adjacent one end thereof for rotation about an axis extending transversely of the carriage and fixed relative thereto; at least a third, normally pavement-engaging wheel mounted on the carriage adjacent the other end thereof for rotation about an axis extending transversely of the carriage and fixed relative thereto in parallelism with said first-mentioned axis; a caster assembly, including a caster wheel mounted on the remainder of the assembly for rotation about a substantially horizontal axis and adapted for engaging the pavement; mounting means shiftably mounting said assembly on the carriage adjacent said other end thereof for rotational movement of the assembly about an upright axis and for upward and downward movement of the assembly relative to the carriage between a withdrawn position disposing said caster wheel above the lowermost extremity of said third wheel and out of engagement with the pavement and an operative position disposing said caster wheel below the lowermost extremity of said third wheel and in engagement with the pavement; control means on the carriage for shifting said assembly between said positions, a drive wheel; means operably coupling the drive wheel with the prime mover; means shiftably mounting the drive wheel on the carriage for movement into and out of operative engagement with said third wheel; and manually controllable means for shifting the drive wheel to and away from said third wheel.

2. In a machine as set forth in claim 1, wherein said control means are operably coupled with said structure, the latter including means for automatically shifting the tool out of engagement with the pavement as the assembly is shifted to said operative position.

3. In a machine as set forth in claim 1, wherein said structure includes a platform pivotally mounted on the carriage for swinging movement about a substantially horizontal axis extending transversely of the carriage, and the tool is mounted on the platform.

4. In a machine as set forth in claim 3, wherein said control means are operably coupled with said platform and including means for swinging the platform to move the tool out of engagement with the pavement as the assembly is shifted to said operative position.

5. In a machine as set forth in claim 4, wherein said pair of wheels are adjacent the front end of the carriage, and said platform extends forwardly beyond the front end of the carriage.

6. In a machine as set forth in claim 1, wherein said control means includes a spring operably coupled with the carriage and the assembly for yieldably biasing the latter toward said withdrawn position, and an adjustably shiftable element on the carriage operably coupled with the assembly for shifting the latter against the action of said spring into said operative position.

7. In a machine as set forth in claim 1, wherein said element is adjustably extensible and includes a pair of threadedly interconnected parts, one of said parts being journalled on the carriage and provided with a handle member for manual rotation thereof, the other of said parts being operably coupled with the assembly.

8. In a machine as set forth in claim 1, wherein are provided spring means yieldably biasing the drive wheel toward a position of engagement with said third wheel, and said manually controllable means includes manually operable means for shifting the drive wheel away from said position and an automatically operable, manually releasable latching device for locking the drive wheel out of said position once it is moved away therefrom.

9. A machine for cutting pavement or the like comprising a carriage having front and rear ends; a pair of laterally spaced, pavement engaging wheels mounted on the carriage adjacent each end thereof respectively for rotation about corresponding parallel, horizontal axes extending transversely of the carriage and fixed relative thereto; a caster assembly, including an upright shaft, a dolly on the lower extremity of the shaft and a caster wheel mounted on the dolly for rotation about a horizontal axis; means mounting the shaft on the carriage adjacent the rear end thereof for rotational movement and vertical reciprocation relative to the carriage, said shaft being reciprocably shiftable between a withdrawn position disposing the caster wheel above the level of the lowermost extremities of said rear wheels and an operative position disposing the caster wheel below the level of the lowermost extremities of the rear wheels; a spring operably coupled with the carriage and the shaft for yieldably biasing the latter toward said withdrawn position; a platform having front and rear extremities; means pivotally mounting the platform intermediate said extremities on the carriage for swinging movement about an axis extending transversely of the carriage and to the rear of said front wheels, the front extremity of the platform being disposed forwardly of the front end of the carriage; a cutter blade mounted on the platform adjacent the front extremity thereof for rotation about an axis parallel to said parallel axes; a prime mover mounted on the platform; means operably coupling the prime mover with the blade; shiftable control structure on the carriage operably coupled with the platform and the caster shaft for reciprocating the latter to said operative position and swinging the platform to a position raising the blade above the pavement when the structure is shifted in one direction and for reciprocating the caster shaft to said withdrawn position and swinging the platform to a position lowering the blade into contact with the pavement when the structure is shifted in the opposite direction an element shiftably mounted on the platform; a drive wheel rotatably mounted on the element; means operably coupling the drive wheel with the prime mover; means on the carriage operably coupled with the element for shifting the latter into and away from a position disposing the drive wheel in frictional driving engagement with one of the rear carriage wheels.

10. In a machine as set forth in claim 9, wherein said platform includes parts engageable with the upper extremity of said caster shaft, and said control structure includes an adjustably shiftable element on the carriage connected with said parts, said parts being disposed rearwardly of the axis of swinging movement of the platform.

11. In a machine as set forth in claim 10, wherein said element is adjustably extensible and includes a threaded shaft rotatably carried by the carriage and a complementally threaded sleeve on said threaded shaft, said sleeve being pivotally connected with the platform for relative swinging movement therebetween about an axis parallel to said axis of swinging movement of the platform.

12. In a machine as set forth in claim 9, wherein is provided spring means yieldably biasing said element toward said position, and releasable latching means for holding the element away from said position.

References Cited in the file of this patent

UNITED STATES PATENTS

| | | |
|---|---|---|
| 1,823,774 | Williams | Sept. 15, 1931 |
| 1,876,380 | Wittick | Sept. 6, 1932 |
| 1,961,540 | Williams | June 5, 1934 |